Jan. 15, 1929.　　　　　　　　　　　　　　　　1,698,971
J. C. SMITH
BORING MACHINE
Filed June 11, 1924　　　2 Sheets-Sheet 1
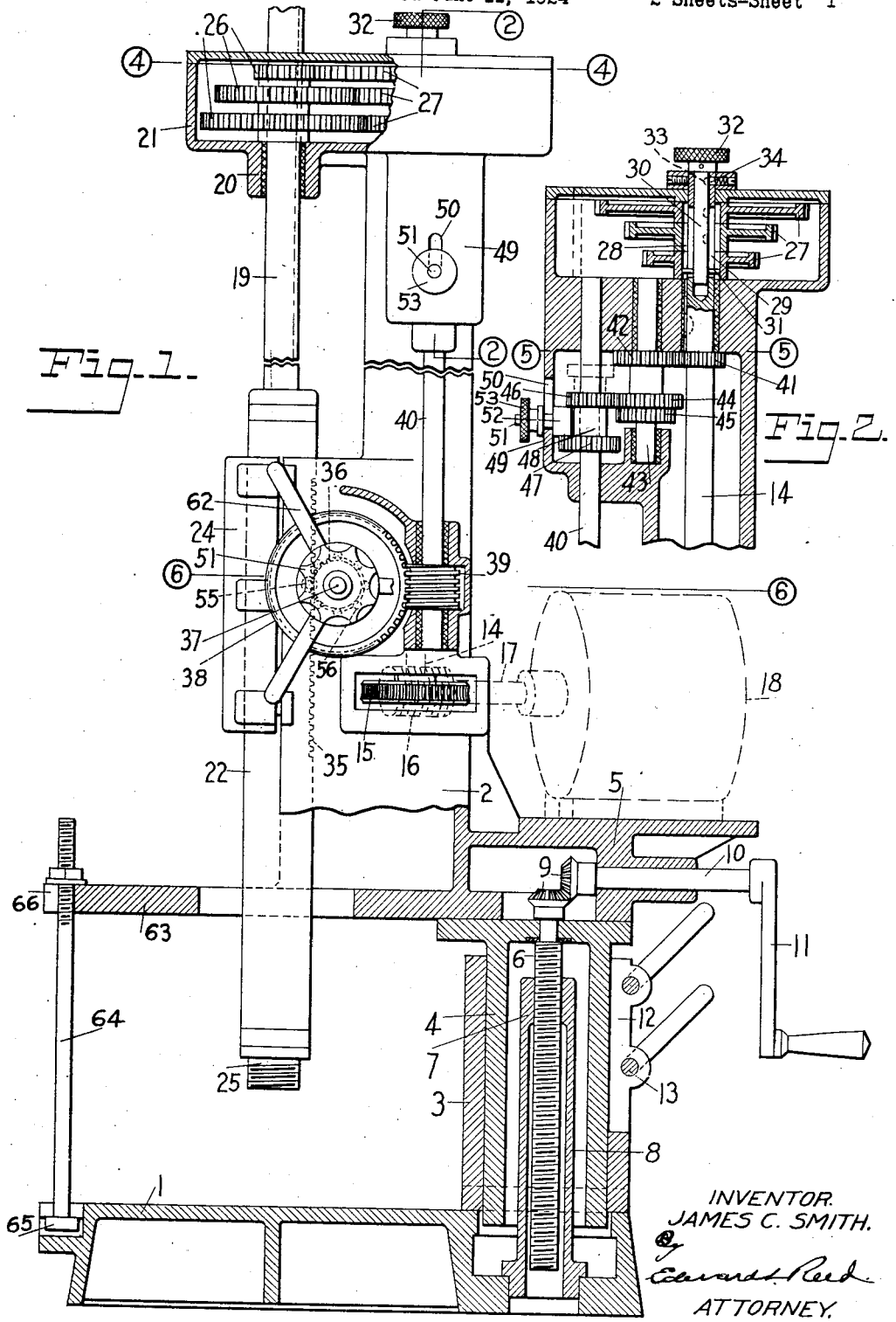
INVENTOR.
JAMES C. SMITH.
ATTORNEY.

Jan. 15, 1929.
J. C. SMITH
BORING MACHINE
Filed June 11, 1924
1,698,971
2 Sheets-Sheet 2
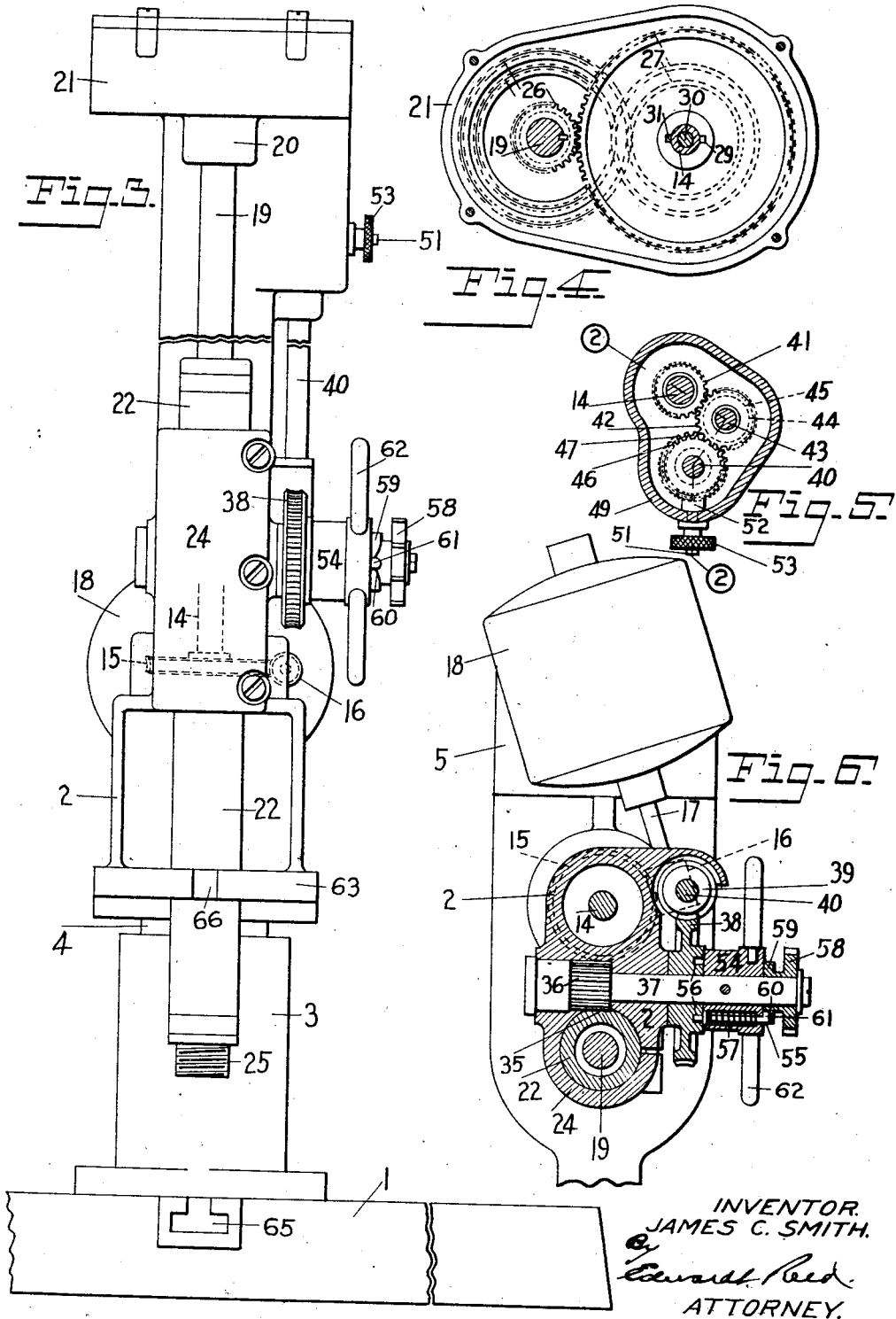
INVENTOR.
JAMES C. SMITH.
Edward Reed
ATTORNEY.

Patented Jan. 15, 1929.

1,698,971

UNITED STATES PATENT OFFICE.

JAMES C. SMITH, OF CINCINNATI, OHIO.

BORING MACHINE.

Application filed June 11, 1924. Serial No. 719,431.

This invention relates to boring machines and is designed more particularly for use in refinishing engine cylinders and the like.

One object of the invention is to provide a mechanism of this kind having efficient and easily operated means for adjusting the boring mechanism with relation to the base on which the work is supported.

A further object of the invention is to provide such a machine which includes variable speed mechanism whereby the cutter spindle may be driven at different speeds from a driving shaft having a uniform speed of rotation.

A further object of the invention is to provide such a machine with a cutter feeding device which may be disconnected and the cutter and its supporting devices quickly returned to their initial positions.

A further object of the invention is to provide such a machine having means associated with the boring mechanism and controlled by the adjustment thereof for clamping the work on the base.

Other objects of the invention will appear as the mechanism is described in detail.

In the accompanying drawings Fig. 1 is a side elevation, partly broken away and partly in section, showing a machine embodying my invention; Fig. 2 is a section taken on the line 2—2 of Fig. 1; Fig. 3 is a side elevation of such a machine looking from the left in Fig. 1; Fig. 4 is a section taken on the line 4—4 of Fig. 1; Fig. 5 is a section taken on the line 5—5 of Fig. 2; and Fig. 6 is a section taken on the line 6—6 of Fig. 1.

In these drawings I have illustrated one embodiment of my invention and have shown the same as comprising a base 1 adapted to support an engine block or other part upon which work is to be performed. Adjustably mounted on this base is a frame 2 which carries the cutter spindle, driving mechanism, motor and associated parts. The base 1 is provided with a vertical guideway, which is preferably in the form of a cylindrical standard 3, rigidly secured to and extending upwardly from the base at one edge thereof. Mounted in this guideway, for vertical adjustment, is a guide or ram 4 which is rigidly secured at its upper end to the frame 2, this frame preferably having a laterally extending portion 5 which is supported upon the upper end of the ram. Journaled in the upper end of the ram is a screw 6 which extends lengthwise thereof and is threaded into a stationary nut 7 which, in the present construction, is carried at the upper end of a hollow stem 8 rigidly supported at its lower end on the base at the lower end of the guideway. The upper end of the screw extends above the top of the ram and is operatively connected by means of beveled gearing 9 with a shaft 10 journaled in the laterally extending portion 5 of the frame and provided at its outer end with a handle 11, whereby the screw may be rotated. Inasmuch as the screw is held against axial movement with relation to the ram and the nut 7 is fixed it will be apparent that the rotation of the screw will impart vertical movement to the ram and to the supporting frame 2. Preferably means are provided for locking the ram in adjusted positions and, in the present instance, the upper portion of the cylindrical standard 3, is split, as shown at 12, and clamping screws 13 are provided for clamping the standard tightly about the ram, thereby firmly securing the same in adjusted positions.

Extending lengthwise of the frame 2 and suitably journaled therein is a vertical shaft 14 to the lower end of which is rigidly secured a worm wheel 15 which meshes with a worm 16 on a shaft 17 of a motor 18, this motor being mounted on a platform forming part of the lateral extension 5 of the frame 2. This vertical shaft is the main or driving shaft for the cutting or finishing mechanism and is connected at its upper end with a spindle or cutter shaft 19 which is journaled at its upper end in a bearing 20 formed in a laterally extending portion 21 of the supporting frame 2 and, in the present instance, constituting a housing to enclose the driving gearing, which will be hereinafter described. The lower portion of the spindle 19 is journaled in a sleeve 22 which is slidably but non-rotatably mounted in a bearing 24 carried by the supporting frame. The spindle extends through and below the sleeve and is provided with means at its lower end, such as a threaded stem 25, by means of which the cutter may be attached thereto. Various cutting or finishing tools may be used in connection with a machine of this character and it is to be understood that the term "cutter" as herein used is intended to include a cutter head, a hone or any other similar device which may be usefully applied to the spindle. The main or driving shaft 14 is driven at a uniform or substantially uniform speed by the motor and in order that the speed of the spindle may be varied with relation to the speed of the main shaft I have interposed between the shaft and the spindle variable speed gearing of a type well adapted for machines of this character. As here shown, I have mounted on the shaft 19, within the housing 21, a set of gears 26, of different diameters, these gears being so mounted on the shaft as to be held against rotation relatively thereto but to permit the shaft to have axial movement in the gears, for a purpose which will hereinafter appear. Mounted on the main shaft 14 is a corresponding set of gears 27 which are also of different diameters and are so arranged that the largest gear of one set will mesh with the smallest gear of the other set. The gears 27 are loosely mounted on the shaft 14 and the hubs thereof are provided with longitudinal slots in the inner walls thereof, as shown at 28, each preferably having two slots on diametrically opposite sides thereof. The upper portion of the shaft 14 is provided with a longitudinal bore, the walls of which are slotted at 29 in line with the respective slots 28 in the hubs of the gears. Slidably mounted in the bore of the shaft 14 is a rod or plunger 30 having lateral projections 31, here shown as a pin mounted in, and extending beyond the respective sides of the plunger and extending through the slots 29 in the shaft and into the corresponding slots in the hubs of the gears. By moving this pin into line with the hub of any one of the gears 27 that gear may be rigidly secured to the shaft for rotation therewith. The plunger is provided at its upper end with a handle or knob 32 by means of which it may be manipulated and means are provided for indicating the position of the projections or pin 31 with relation to the gears and for retaining the plunger in adjusted positions. As here shown, the plunger is provided with three recesses 33 adapted to receive a spring pressed detent 34, the recesses being so positioned with relation to the detent that when the detent is in engagement with any one of them the projections 31 will be in operative relation to the corresponding gear 27.

The sleeve 22, in which the lower portion of the spindle 19 is journaled, is slidable in its bearing but is held against axial movement with relation to the spindle 19 and by adjusting the sleeve 22 vertically the position of the spindle and its cutter with relation to the work may be adjusted. In the present construction I have provided means for automatically advancing the spindle and the cutter into the cylinder as the work progresses. To this end the sleeve 22 is provided with a longitudinal toothed rack which, in the present construction, is provided by forming teeth in the sleeve, as shown at 35. Meshing with this toothed rack is a pinion 36 which is rigidly secured to a shaft 37 extending transversely to the sleeve and journaled in suitable bearings in the frame 2. Mounted on the shaft 37 and adapted to be rigidly secured thereto is a worm wheel 38 which meshes with a worm 39 rigidly secured to a vertical or feed shaft 40 which is journaled at its upper and lower ends in bearings on the frame 2 and is operatively connected with the main shaft 14. In that form of the device here shown, I have also provided a variable speed connection between the main shaft 14 and the feed shaft 40. For this purpose the shaft 14 is provided with a gear 41 which meshes with a gear 42 and a counter shaft 43. Mounted on the shaft 43 and rigidly connected with the gear 42 are two other gears 44 and 45 which are adapted to mesh respectively with gears 46 and 47 mounted on the feed shaft 40. The gears 46 and 47, which are of different diameters, are rigidly connected one to the other by a sleeve 48 which is splined on the feed shaft 40 so as to rotate therewith and to be capable of movement longitudinally thereof. Thus, by moving the gear unit 46 and 47 axially to cause a selected one of said gears to mesh with a corresponding gear on the counter shaft 43 the main shaft may be caused to rotate the feed shaft at the desired speed. Any suitable means may be provided for shifting the gearing unit and for retaining the same in its adjusted position. In the present construction a housing 49 in which the gearing is enclosed is provided in one wall thereof with a vertical slot 50 in which is slidably mounted a stud or pin 51 having on the inner side of the wall a head 52 which engages between the two gears 46 and 47 so that when the pin is moved lengthwise of the slot 50 the gear unit will also be moved. That end of the stud projecting on the outer side of the wall of the housing is provided with a nut 53 by means of which it may be manipulated and which, when tightened down on the stud, will draw the head 52 tightly against the wall of the housing and thus clamp the same in its adjusted position.

The feeding movement of the sleeve 42, the spindle and the cutter is, of course, quite slow and it is desirable that means should be provided whereby when the work is completed these parts may be quickly returned to their initial positions. To this end the worm gear 38 is, as has been stated, loosely mounted on the shaft 37 and is normally connected therewith by means of a suitable clutch. As here shown this clutch comprises a hub member 54 which is rigidly secured to the shaft 37 and has slidably mounted therein a pin 55 the inner end of which is adapted to enter any one of a series of recesses 56 formed in the hub of the worm gear 38. A spring 57 serves to hold the pin 55 normally in operative engagement with the worm wheel and thereby connect the latter with the shaft. Rotatably mounted on the outer end of the shaft beyond the hub 54 is a hand wheel 58 with which is connected a collar or flange 59 having a recess 60, the edges of which are flared, as shown in Fig. 3, and which is adapted to receive the head of the pin 55 which is here shown as comprising an offset or laterally extending portion 61 of the pin. Consequently the rotation of the hand wheel 58 will cause the flared edge or cam portion of the flange 59 to engage beneath the head 61 of the pin and to withdraw the inner end of the pin from the recess in the worm gear 38, thereby releasing the shaft 37 for rotation with relation to said worm gear. The rotation of the hub 54, which may be accomplished by means of spokes 62 or other suitable actuating means, will then rotate the shaft and pinion 36 and the sleeve 22 and its connected parts may be quickly moved from one position to another.

The supporting frame 2 is also provided with means for clamping the work, such as a cylinder block, on the base 1 and holding the same firmly during the reboring or refinishing operation. In the present arrangement the lower end of the frame 2 overlaps the base but is of a width less than the width of the base. I have therefore provided it with a lateral extension or plate 63 so as to give the lower part of the frame a width corresponding substantially to the width of the base 1. This frame is adjusted in the manner heretofore described to accommodate it to cylinder blocks or other work of different sizes and when the work is in position the frame is lowered until the bottom of the frame or the clamping member rests upon the top of the work, thereby firmly securing it in position. Should it be found desirable a connecting bolt 64 may be interposed between the outer edge of the extension or plate 63 and the base. As here shown, the base has a T-shaped slot 65 to receive the head of the bolt and the plate 63 is recessed at 66 to receive the upper portion of the bolt the latter being provided with a nut above the plate to exert clamping action on the latter.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a mechanism of the character described, a base adapted to support a part on which work is to be done, a hollow standard carried by said base, said standard having its upper portion split, a ram slidably mounted in said standard, a fixed nut carried by said base within said standard, a screw rotatably mounted in said ram, held against axial movement with relation thereto, and threaded into said nut, means for actuating said screw to adjust said ram, devices acting on the split end of said standard to clamp the same about said ram, a frame carried by said ram, a spindle carried by said frame, and means mounted on said frame for actuating said spindle.

2. In a mechanism of the character described, a supporting frame, a main shaft rotatably mounted in said frame, means for actuating said main shaft, a sleeve slidably and non-rotatably mounted in said frame, a spindle journaled in said sleeve and held against axial movement with relation thereto, a driving connection between said spindle and said main shaft, said sleeve having a toothed rack extending lengthwise thereof, a transverse shaft journaled in said supporting frame, a pinion secured to said shaft and meshing with said toothed rack, a driving member rotatably mounted on said transverse shaft, a feed shaft operatively connected with said main shaft, means carried by said feed shaft for actuating said driving member, a hub rigidly secured to said transverse shaft, a pin slidably mounted in said hub and having a head projecting beyond the outer end of said hub, said driving member having a recess to receive the adjacent end of said pin, a spring tending to hold said pin in said recess, a member rotatably mounted on said shaft at the end of said hub and having a cam shaped portion to engage the head of said pin and withdraw the latter, and means for rotating said hub when said pin has been withdrawn.

3. In a mechanism of the character described, a supporting frame, a main shaft journaled in said frame, a sleeve slidably and non-rotatably mounted in said frame, a spindle having one end rotatably and slidably mounted in said frame and having its other end journaled in said sleeve and held against axial movement relative thereto, an operative connection between said spindle and said shaft, said sleeve having a longitudinally extending toothed rack, a shaft journaled in said frame and extending transversely to said sleeve, a pinion carried by said transverse shaft and meshing with said toothed rack, a worm gear rotatably mounted on said transverse shaft, a feed shaft, a worm secured to said feed shaft and meshing with said worm wheel, means for operatively connecting said feed shaft with said main shaft, a hub rigidly secured to said transverse shaft, a pin slidably mounted in said hub and having an offset portion at the outer end of said hub, said worm gear having a recess to receive the end of said pin, a spring tending to retain said end of said pin in said recess, a hand wheel rotatably mounted on said shaft and having a flanged portion provided with a cam surface to engage the offset end of said pin and withdraw the latter, and means connected with said hub for rotating the shaft with relation to said worm wheel when said pin has been withdrawn.

In testimony whereof, I affix my signature hereto.

JAS. C. SMITH.